(12) United States Patent
Colonna et al.

(10) Patent No.: US 11,585,842 B2
(45) Date of Patent: Feb. 21, 2023

(54) AVIONIC FUNCTION TEST DEVICE, ASSOCIATED AIRCRAFT, METHOD AND COMPUTER PROGRAM

(71) Applicant: THALES, Courbevoie (FR)

(72) Inventors: François Colonna, Mérignac (FR); André Cleroux, Mérignac (FR); Marion Nicaud, Mérignac (FR)

(73) Assignee: THALES, Courbevoie (FR)

( * ) Notice: Subject to any disclaimer, the term of this patent is extended or adjusted under 35 U.S.C. 154(b) by 314 days.

(21) Appl. No.: 16/857,666

(22) Filed: Apr. 24, 2020

(65) Prior Publication Data

US 2020/0348350 A1    Nov. 5, 2020

(30) Foreign Application Priority Data

May 2, 2019    (FR) ...................................... 19 04613

(51) Int. Cl.
| | | |
|---|---|---|
| *G01R 31/00* | (2006.01) | |
| *G06F 30/20* | (2020.01) | |
| *G07C 5/00* | (2006.01) | |
| *G06F 119/02* | (2020.01) | |

(52) U.S. Cl.
CPC .......... *G01R 31/008* (2013.01); *G06F 30/20* (2020.01); *G07C 5/008* (2013.01); *G06F 2119/02* (2020.01)

(58) Field of Classification Search
None
See application file for complete search history.

(56) References Cited

U.S. PATENT DOCUMENTS

| | | | | |
|---|---|---|---|---|
| 5,077,671 A | * | 12/1991 | Leslie | ................ G05B 23/0256 |
| | | | | 324/73.1 |
| 10,703,508 B1 | * | 7/2020 | Mehnert | ................. G06F 30/15 |
| 11,042,673 B1 | * | 6/2021 | McLean | .................... G09B 9/08 |
| 11,080,381 B2 | * | 8/2021 | Zhang | ..................... G06F 21/32 |
| 2011/0246000 A1 | * | 10/2011 | Shavit | ................. G08G 5/0026 |
| | | | | 701/14 |

(Continued)

FOREIGN PATENT DOCUMENTS

| | | |
|---|---|---|
| FR | 2 990 192 A1 | 11/2013 |
| FR | 3 061 794 A1 | 7/2018 |
| FR | 3 062 204 A1 | 7/2018 |

OTHER PUBLICATIONS

Qin, "Real-time downloading and analysis of QAR data using Air-to-Ground wireless communication", 2019, IEEE (Year: 2019).*

(Continued)

*Primary Examiner* — Hossain M Morshed
(74) *Attorney, Agent, or Firm* — ArentFox Schiff LLP

(57) ABSTRACT

The present invention relates to an electronic test device for at least one avionic function to be tested, intended to be embedded in an aircraft, the aircraft comprising at least one avionic equipment item,
the test device being intended to be connected to the at least one avionic equipment item and comprising:
an acquisition module, configured to acquire flight data from the at least one avionic equipment item, and
a computing module, configured to compute simulated output data, from acquired flight data and via an implementation of the avionic function to be tested, the avionic function to be tested being able, from the flight data, to deliver the output data.

21 Claims, 3 Drawing Sheets

(56) References Cited

U.S. PATENT DOCUMENTS

| | | | | |
|---|---|---|---|---|
| 2014/0350780 A1* | 11/2014 | Chai | ................. | G05B 23/0256 |
| | | | | 701/32.8 |
| 2015/0227647 A1* | 8/2015 | Shelton | ................. | G06F 30/20 |
| | | | | 703/13 |
| 2018/0155052 A1* | 6/2018 | Lacroix | ................ | G08G 5/0082 |
| 2019/0130767 A1* | 5/2019 | Letsu-Dake | ........... | G01C 23/00 |

OTHER PUBLICATIONS

French Search Report, from the French Patent Office in counterpart French Application No. 1904613, dated Jan. 31, 2020.

* cited by examiner

AVIONIC FUNCTION TEST DEVICE, ASSOCIATED AIRCRAFT, METHOD AND COMPUTER PROGRAM

CROSS-REFERENCE TO RELATED APPLICATIONS

This application claims priority to French Application No. 19 04613, filed on May 2, 2019. The disclosure of the priority application is incorporated in its' entirety herein by reference.

FIELD OF THE INVENTION

The present invention relates to a test device for at least one avionic function to be tested, intended to be embedded in an aircraft.

The invention also relates to in aircraft comprising such a test device.

The invention also relates to a method for testing at least one avionic function to be tested.

The invention also relates to a computer program comprising software instructions which, when implemented by a computer, carry out such a test method.

The invention applies to the field of avionics, and more specifically to the development and testing of avionic functions.

"Aircraft" refers to a moving vehicle piloted by at least one pilot, and in particular able to fly in the Earth's atmosphere, such as an airplane, a drone or a helicopter.

BACKGROUND OF THE INVENTION

In order to develop a new avionic function, it is known to carry out different steps, in order to develop and test this function. These steps generally comprise the maturation of the function from simulated flight data, then flight data recovered on flight tests, this maturation being done on the ground. The development of such a function comprises making an operational prototype comprising the matured function, and integrating the operational prototype into an aircraft in order to test it in flight, the operational prototype having been previously certified as compliant following tests on the ground, before being integrated into the aircraft.

However, such a development method is complex. Indeed, it in particular requires a significant flight database, the flight database having to be as exhaustive as possible to guarantee the effectiveness of the development of the avionic function. This development method also requires a selection of relevant flight data for the maturation of the avionic function among the data from the flight database, as well as a significant maturation time of the avionic function before being able to make the operational prototype for the in-flight tests.

SUMMARY OF THE INVENTION

The aim of the invention is to propose a test device allowing a more effective and less complex development of avionic functions.

To that end, the invention relates to a test device of the aforementioned type, in which the aircraft comprises at least one avionic equipment item, the test device being intended to be connected to the at least one avionic equipment item and comprising:
an acquisition module, configured to acquire flight data from the at least one avionic equipment item, and
a computing module, configured to compute simulated output data, from acquired flight data and via an implementation of the avionic function to be tested, the avionic function to be tested being able, from said flight data, to deliver said output data.

Such a test device makes it possible to recover the flight data directly from the avionic equipment of an aircraft in order to develop the avionic function to be tested in flight, without this avionic function having been previously validated through tests on the ground. This makes it possible to accelerate the maturation step of the function, the acquisition module making it possible to acquire the relevant flight data directly as a function of performed in-flight tests. This also makes it possible to limit the database by ultimately recovering only the simulated output data computed as a function of the in-flight data.

According to other aspects, the test device includes one or more of the following features, considered alone or according to any technically possible combination(s):
- the test device comprises, for the connection with each avionic equipment item, only a one-way receiver configured to receive the flight data coming from said avionic equipment item;
- the test device comprises, for the connection with each avionic equipment item, a transceiver configured to send said avionic equipment item a request and to receive the flight data coming from said avionic equipment item in response to said request;
- the test device further comprises a sending module configured to transmit the computed simulated output data to an equipment item outside the aircraft, such as an equipment item on the ground;
- the test device further comprises a first receiving module configured to receive a change signal of the avionic function to be tested, in particular coming from an equipment item outside the aircraft, such as an equipment item on the ground, and a change module configured to modify the avionic function to be tested as a function of the received change signal;
- the test device comprises a memory configured to store a plurality of avionic functions, a second receiving module configured to receive a selection signal of the avionic function, in particular coming from an equipment item outside the aircraft, such as an equipment item on the ground, and a selection module configured to select, as a function of the received selection signal, the avionic function to be tested among said avionic functions stored in the memory;
- the avionic function to be tested is chosen from the group consisting of: a function for avoiding collisions with the ground, a function for detecting oscillations caused by aeroelastic instabilities, a function for detecting oscillations caused by a pilot, a function for avoiding collisions with another aircraft, and a function for monitoring of the path.

The invention also relates to an aircraft comprising a device for testing at least one avionic function to be tested as defined above.

The invention also relates to a test method of the aforementioned type, the method being carried out by an electronic test device intended to be embedded in an aircraft, the aircraft comprising at least one avionic equipment item, the test device being intended to be connected to the at least one avionic equipment item, the method including:
a step for acquiring flight data coming from the at least one avionic equipment item, and a step for computing simulated output data, from acquired flight data and via an implementation of the avionic function to be tested, the avionic function to be tested delivering, from said flight data, said output data.

The invention also relates to a computer program product comprising software instructions which, when executed by a computer, implement a test method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION OF PREFERRED EMBODIMENTS

Figure 1:
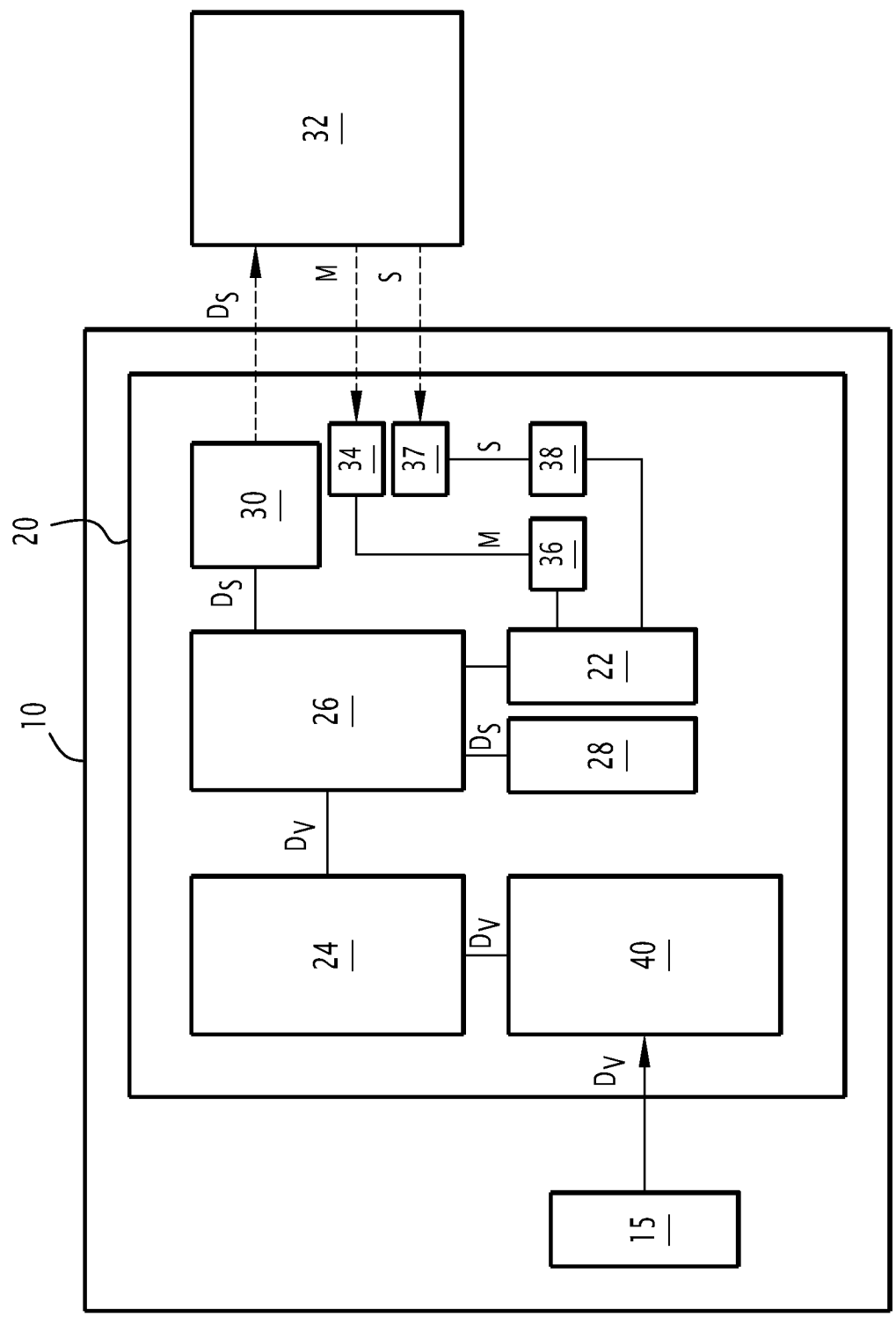
FIG. 1 is a schematic illustration of an aircraft in particular comprising a test device according to a first embodiment.
Figure 2:
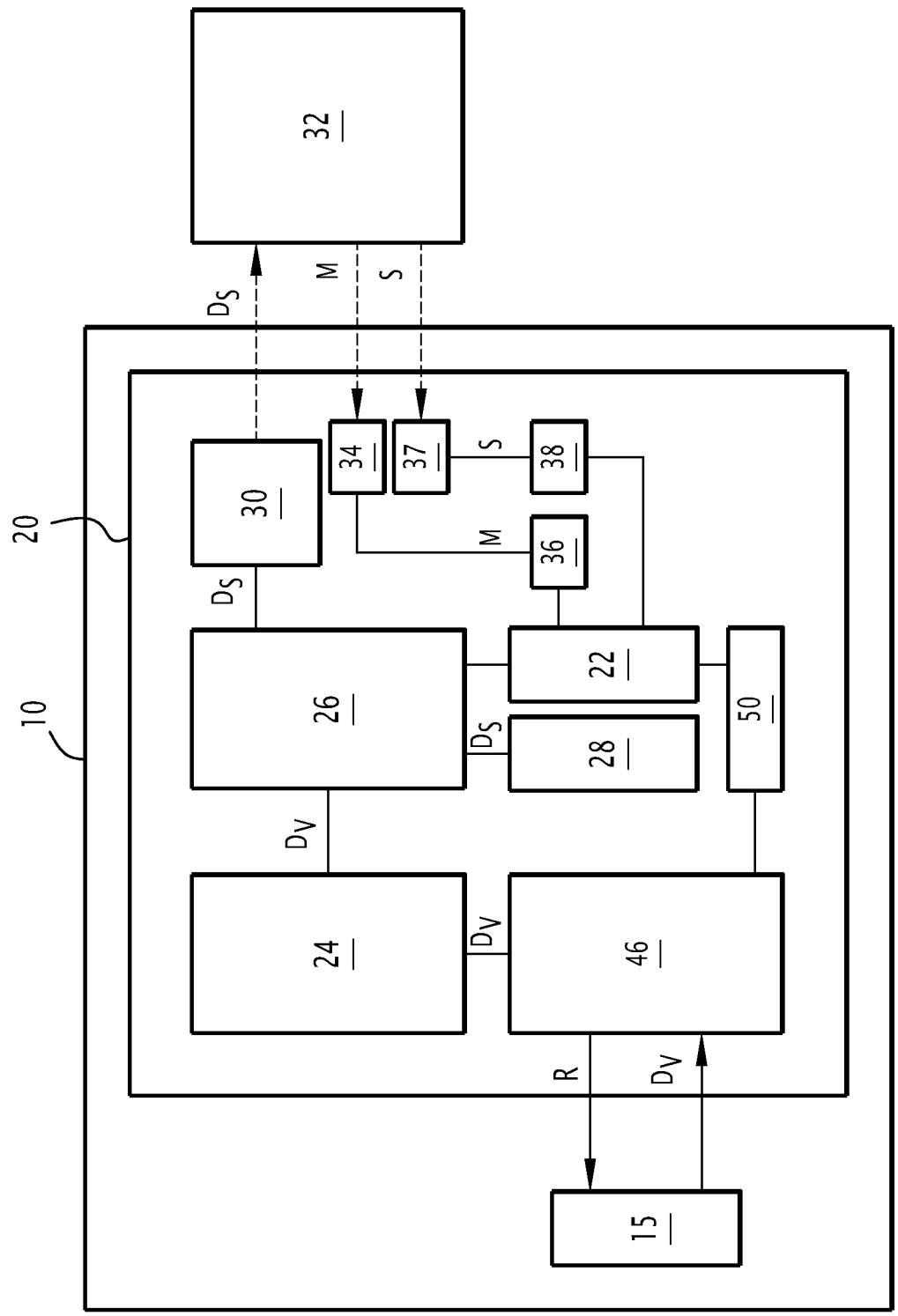
FIG. 2 is a schematic illustration of an aircraft in particular comprising a test device according to a second embodiment.

FIGS. 1 and 2 each show an aircraft 10, such as an airplane, comprising at least one avionic equipment item 15 and an electronic test device 20 for an avionic function to be tested. In the example of FIGS. 1 and 2, only one avionic equipment item 15 is shown in order to simplify the drawings.

The aircraft 10 is preferably a certified aircraft, that is to say, an aircraft having a valid type certificate. A Type Certificate (TC) refers to an administrative document issued by a certifying authority for an aircraft, an engine or a propeller. This administrative document certifies that the product covered by the certificate, such as the aircraft, meets a set of specifications guaranteeing its navigability. The certifying authority is for example the European Aviation Safety Agency (EASA) for Europe, the FAA (Federal Aviation Administration) for the United States. The type certificate is necessary for the commercial exploitation of an aircraft.

"Avionic equipment item" refers to an electronic equipment item intended to be embedded in the aircraft 10.

The aircraft 10 comprises one or several of the avionic equipment items 15 listed below as examples:
  a satellite positioning system, such as a GPS (Global Positioning System);
  an Attitude and Heading Reference System (AHRS);
  a Flight Management System (FMS) of the aircraft;
  an Instrument Landing System (ILS);
  an Air Data Unit (ADU);
  a Flight By Wire (FBW) system;
  a Full Authority Digital Engine Control (FADEC) system;
  a manual flight control system;
  an air traffic control system, also called Automatic Dependent Surveillance-Broadcast (ADS-B) system;
  a Traffic alert and Collision Avoidance System (TCAS); and
  an electronic sensor, such as a temperature sensor.

Each avionic equipment item 15 is preferably a certified avionic equipment item, that is to say, an equipment item meeting the requirements of a valid technical standard, such as the ETSO (European Technical Standard Order) standard, the TSO (Technical Standard Order) standard or the JTSO (Joint Technical Standard Order) standard. A technical standard refers to a minimum performance standard defined by a certifying authority for an avionic equipment item, a part, a material, or a method used in an aircraft. The certifying authority is for example the EASA for the ETSO standard, the FAA for the TSO standard, or the JAA (Joint Aviation Authorities) for the JTSO standard. An accreditation delivered by the certifying authority is necessary to manufacture so-called certified avionic equipment. This accreditation further certifies that said manufactured avionic equipment items satisfy the technical standard in question.

The test device 20 is intended to be embedded in the aircraft 10 and to be connected to the at least one avionic equipment item 15. It is configured to compute simulated output data Ds from flight data Dv coming from the at least one avionic equipment item 15 and according to the avionic function to be tested.

The test device 20 comprises a memory 22 configured to store at least one avionic function, preferably several avionic functions, a module 24 for acquiring flight data Dv coming from at least one avionic equipment item 15, and a module 26 for computing, via an implementation of the avionic function to be tested, simulated output data Ds. The avionic function(s) stored in the memory 22 comprises the avionic function to be tested, the latter using the acquired flight data Dv as input and delivering the simulated output data Ds as output.

As an optional addition, the test device 20 comprises a storage module 28 connected to the computing module 26 and configured to store the simulated output data Ds by the computing module 26.

As another optional addition, the test device 20 comprises a sending module 30 connected to the computing module 26 and configured to transmit the computed simulated output data Ds to an equipment item 32 outside the aircraft 10, such as an equipment item on the ground.

As another optional addition, the test device 20 comprises a first module 34 for receiving a change signal M of the avionic function to be tested, in particular coming from the outside equipment item 32. In a variant that is not shown, the first receiving module 34 is configured to receive the change signal M from another equipment item inside or outside the aircraft 10. According to this addition, the test device 20 comprises a module 36 for changing the avionic function to be tested as a function of the received change signal M.

For example, each avionic function stored in the memory 22 is chosen from the group consisting of: a function for avoiding collisions with the ground, a function for detecting oscillations induced by aeroelastic instabilities, a function for detecting pilot-induced oscillations (PIO), a function for avoiding collisions with another aircraft, and a function for monitoring of the path.

The function for avoiding collision with the ground compares the set of possible paths of the aircraft to a database of the terrain and outside obstacles and computes an avoidance path in case of risk of collision. The input flight data Dv for this function for example comprise: the position of the aircraft, such as its GPS; attitude information of the aircraft, such as the heading, the pitch, the roll, the associated derivatives, and the load factors; data from the outside air, such as the indicated airspeed, the true airspeed and the altitude; engine operating data, such as the engine speed and the pressure ratio of the engine; electronic flight control data; the frequency of the ILS; the type of approach of the paths to be followed by the flight management system; and mechanical flight control data. The simulated output data Ds for this function then for example include: a remaining time before the detected collision; the flight data Dv during the detection of the collision risk; a status of a terrain sensor; and the calculated avoidance path.

The function for detecting oscillations induced by aeroelastic instabilities uses the flight data Dv to detect an abnormal aeroelastic instability behavior, and if applicable generates a modification of the electric flight controls making it possible to correct the detected abnormal behavior. The flight data Dv as input for this function for example include: the attitude information of the aircraft; the position of the aircraft; the outside air data; the engine operating data; the electric flight control data and the mechanical flight control data. The simulated output data Ds for this function for example include: a state of the detection of the aeroelastic instability (in % reliability); the flight data Dv during the detection of the abnormal behavior; and the generated change of the electric flight controls.

The function for detecting pilot induced oscillations uses the flight data Dv to detect an abnormal behavior of the aircraft induced by a pilot, and if applicable generates a modification of the electric flight controls making it possible to correct the detected abnormal behavior. The flight data Dv as input for this function for example include: the attitude information of the aircraft; the outside air data; the engine operating data; the electric flight control data; and the mechanical flight control data. The simulated output data Ds for this function for example include: a state of the detection of the pilot-induced oscillations (in % reliability); the flight data Dv during the detection of the abnormal behavior; and the generated change of the electric flight controls.

The collision avoidance function with another aircraft compares the geographical data and the state of the aircraft with air traffic control and traffic alert and collision avoidance data, computes an avoidance path in case of risk of collision, and displays a message with the computed avoidance path. The flight data Dv as input for this function for example include: the position of the aircraft; the outside air data; the engine operating data; the electric flight control data; air traffic control data; traffic alert and collision avoidance data; and the mechanical flight control data. The simulated output data Ds for this function for example include: a remaining time before the detected collision; the flight data Dv during the detection of the collision risk; the calculated avoidance path and the displayed message.

The path monitoring function compares geographical data and the state of the aircraft to an anticipated path of the aircraft, and records an event in case of unanticipated behavior of the aircraft with respect to the anticipated path. The flight data Dv as input for this function for example include: the position of the aircraft; the attitude information of the aircraft; the engine operating data; the electric flight control data; the ILS frequency; and the mechanical flight control data. The simulated output data Ds for this function for example include: a remaining time before the unanticipated behavior; the flight data Dv during the detection of the unanticipated behavior; and a parameter responsible for the unanticipated behavior.

In a variant or as an optional addition, at least one of the avionic functions stored in the memory 22 is a data collection function, able to select data among the flight data Dv at the input of said function. The function for example estimates a state of the equipment items and their lifetime as a function of avionic data, such as the temperature of the equipment items, and determines maintenance if necessary.

As another optional addition, the memory 22 is configured to store a plurality of avionic functions, and the test device 20 comprises a second module 37 for receiving a signal S for selecting the avionic function to be tested, for example coming from the outside equipment item 32. In a variant that is not shown, the second receiving module 37 is configured to receive the selection signal S from another equipment item inside or outside the aircraft 10. The test device 20 then comprises a module 38 for selecting the avionic function to be tested among the avionic functions stored in the memory 22, as a function of the received selection signal S.

In the examples of FIGS. 1 and 2, the acquisition 24 and computing 26 modules, as well as, by way of optional addition, the storage 28, sending 30, receiving 34, 37, change 36 and selection 38 modules, are made in the form of programmable logic components, such as one or several FPGAs (Field-Programmable Gate Array), or in the form of dedicated integrated circuits, of the ASIC type (Application-Specific Integrated Circuit).

In a variant that is not shown, the test device 20 comprises an information processing unit, including a memory, for example the memory 22, and a processor associated with the memory. The acquisition 24 and computing 26 modules, as well as, by way of optional addition, the storage 28, sending 30, receiving 34, 37, change 36 and selection 38 modules are then each made in the form of software, or a software component, executable by the processor. The memory is then able to store acquisition software for flight data Dv coming from at least one avionic equipment item 15 and software for computing simulated output data Ds, and as an optional addition, software for storing simulated output data Ds, software for sending simulated output data Ds to the outside equipment item 32, first software for receiving the change signal M, second software for receiving the selection signal S, software for changing the avionic function to be tested as a function of the received change signal M, and software for selecting the avionic function to be tested as a function of the received selection signal S. The processor 32 is then configured to execute each of the software applications from among the acquisition software, the computing software, and as an optional addition, the storage software, the sending software, the first receiving software, the second receiving software, the change software and the selection software.

When the test device 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system.

As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The acquisition module 24 is connected to the computing module 26 and is configured to send it flight data Dv acquired from the avionic equipment item(s) 15.

The computing module 26 is connected to the memory 22 and is configured to implement an avionic function to be tested among the avionic functions stored in the memory 22. The computing module 26 is then configured to compute simulated output data Ds, from flight data Dv acquired by the acquisition module and via the implementation of said avionic function to be tested, the avionic function to be tested being able, from said flight data Dv, to deliver said simulated output data Ds.

The computing module 26 is configured to implement the avionic function to be tested from acquired flight data Dv, that is to say, to execute the avionic function to be tested from acquired flight data Dv. The computing module 26 is then configured to compute simulated output data Ds resulting from the application of the avionic function to be tested to the acquired flight data Dv.

For example, when the avionic function to be tested is the function for avoiding collision with the ground, the computing module 26 is configured to compare the set of possible paths of the aircraft 10 to a database of the terrain and outside obstacles and to compute, from the acquired flight data Dv, an avoidance path in case of risk of collision, and to deliver, as output, the time remaining before the detected collision, the flight data Dv during the detection of the collision risk, the state of the terrain sensor, and the computed avoidance path.

When the avionic function to be tested is the function for detecting oscillations induced by aeroelastic instabilities, the computing module 26 is configured to use the flight data Dv to detect an abnormal aeroelastic instability behavior, and if applicable to generate a change of the electric flight controls making it possible to correct the detected abnormal behavior, and to deliver, as output, the state of the detection of the aeroelastic instability (in % reliability), the flight data Dv during the detection of the abnormal behavior, and the generated change of the electric flight controls.

When the avionic function to be tested is the function for detecting pilot-induced oscillations induced by aeroelastic instabilities, the computing module 26 is configured to use the flight data Dv to detect an abnormal behavior of the aircraft induced by the pilot, and if applicable to generate a change of the electric flight controls making it possible to correct the detected abnormal behavior, and to deliver, as output, the state of the detection of the pilot-induced oscillations (in % reliability), the flight data Dv during the detection of the abnormal behavior, and the generated change of the electric flight controls.

When the avionic function to be tested is the collision avoidance function with another aircraft, the computing module 26 is configured to compare the geographical data and the state of the aircraft, coming from acquired flight data Dv, with air traffic control and traffic alert and collision avoidance data, also coming from acquired flight data Dv, to compute an avoidance path in case of collision risk, and to display a message for the computed avoidance path, and to deliver, as output, the time remaining before the detected collision, the flight data Dv upon the detection of the collision risk, the computed avoidance path and the displayed message.

When the avionic function to be tested is the path monitoring function, the computing module 26 is configured to compare geographical data and the state of the aircraft to an anticipated path of the aircraft, coming from acquired flight data Dv, and to record an event in case of unanticipated behavior of the aircraft with respect to the anticipated path, and to deliver, as output, the time remaining before the unanticipated behavior, the flight data Dv upon the detection of the unanticipated behavior, and the parameter responsible for the unanticipated behavior.

As an optional addition, the computing module 26 is configured to transmit the computed simulated output data Ds to the storage module 28 and/or to the sending module 30.

The sending module 30 for example comprises remote communication means, able to send the outside equipment item 32 the simulated output data Ds.

The outside equipment item 32 is for example a ground equipment item comprising remote communication means, in particular able to receive the simulated output data Ds, transmitted by the sending module 30.

In addition, the outside equipment item 32 is configured to generate a change signal M and/or a selection signal S, and comprises remote communication means able to transmit the generated change signal M to the first receiving module 34 and/or the generated selection signal S to the second receiving module 37.

In a variant that is not shown, separate outside equipment items are used to receive flight data Dv, to transmit the change signal M and to transmit the selection signal S.

For example, the change signal M comprises change data for an avionic function to be tested making it possible to change or update the avionic function to be tested, or alternatively one of the avionic functions stored in the memory 22.

For example, the selection signal S comprises selection data of the avionic function to be tested, identifying the avionic function to be tested among the avionic functions stored in the memory 22.

The first receiving module 34 for example comprises remote communication means, able to receive the change signal M sent by the outside equipment item 32. The first receiving module 34 is connected to the change module 36 and is configured to send it the received change signal M.

The second receiving module 37 for example comprises remote communication means, able to receive the selection signal S sent by the outside equipment item 32. The second receiving module 37 is connected to the selection module 38 and is configured to send it the received selection signal S.

In a variant that is not shown, the test device 20 comprises a single receiving module, for the change signal M and the selection signal S transmitted by the outside equipment item 32. This single receiving module is connected to the change module 36 and the selection module 38, and is configured to send the change signal M to the change module 36, and respectively the selection signal S to the selection module 38.

The change module 36 is connected to the memory 22 and is configured to change one of the avionic functions stored in the memory 22, for example the avionic function to be tested, as a function of the received change signal M. More specifically, the change module 36 is configured to change or update the avionic function to be tested, or alternatively one of the avionic functions stored in the memory 22, by using the change data of said avionic function of the received change signal M.

The selection module 38 is connected to the memory 22 and is configured to select the avionic function to be tested among the avionic functions of the memory 22, as a function of the received selection signal S. The selection of the received selection signal S for example contains an identifier of the avionic function to be tested.

According to the embodiment of FIG. 1, the test device 20 comprises, for the connection with each avionic equipment item 15, only a one-way receiver 40 configured to receive the flight data Dv coming from said avionic equipment item 15. The or each connection between an avionic equipment item 15 and the test device 20 is then a one-way link, from said avionic equipment item 15 to the test device 20.

According to the example of FIG. 1, the test device 20 comprises a single one-way receiver 40, connected to each avionic equipment item 15.

The one-way receiver 40 is connected to the acquisition module 24 and is configured to receive the flight data Dv coming from the corresponding avionic equipment item(s) 15 and to send them to the acquisition module 24.

According to the embodiment of FIG. 2, the test device 20 comprises, for the connection with each avionic equipment item 15, a transceiver 46 configured to send said avionic equipment item 15 a request R and to receive flight data Dv coming from said avionic equipment item 15 in response to said request R. The or each connection between an avionic equipment item 15 and the test device 20 is then a two-way link.

According to the example of FIG. 2, the test device 20 comprises a single transceiver 46, connected to each avionic equipment item 15.

The transceiver 46 is connected to the acquisition module 24 and the memory 22 is further configured to store, for each stored avionic function, a list of the flight data Dv necessary as input for said avionic function.

In this embodiment, the test device 20 further comprises a request module 50 connected to the memory 22 and the transceiver 46 and configured to generate one or several requests R as a function of the list of flight data Dv necessary as input for the avionic function to be tested and a table of the available flight data of each avionic equipment item 15. The request module 50 is then configured to send the transceiver 46 each generated request R.

Each transceiver 46 is configured to send each respective avionic equipment item 15 the request(s) R.

Additionally, the change module 36 is configured to change the list of flight data Dv associated with one of the avionic functions stored in the memory 22, for example that associated with the avionic function to be tested, as a function of the change signal M.

For example, the change signal M comprises change data from the list of flight data Dv associated with the avionic function to be tested, or alternatively with one of the avionic functions stored in the memory 22, making it possible to modify or update said list of flight data Dv. The change module 36 is then configured to change or update said list of flight data Dv as a function of change data from the list of flight data Dv of a received change signal M.

Each request R is preferably an inert signal with respect to the operation of the at least one avionic equipment item 15.

For example, each request R is a signal based on a specific protocol, such as an IDEM protocol, making it possible to query an avionic equipment item 15 on flight data comprised in a memory of the avionic equipment item 15, without disrupting its operation, the addresses authorized by the avionic equipment item 15 being predefined.

For example, when the request R is according to the IDEM protocol, it comprises query labels containing an address, an offset of the address and a queried flight data type.

Upon receiving such a request R, each avionic equipment item 15 is configured to send the transceiver a response comprising response labels in particular comprising the queried flight data.

Figure 3:
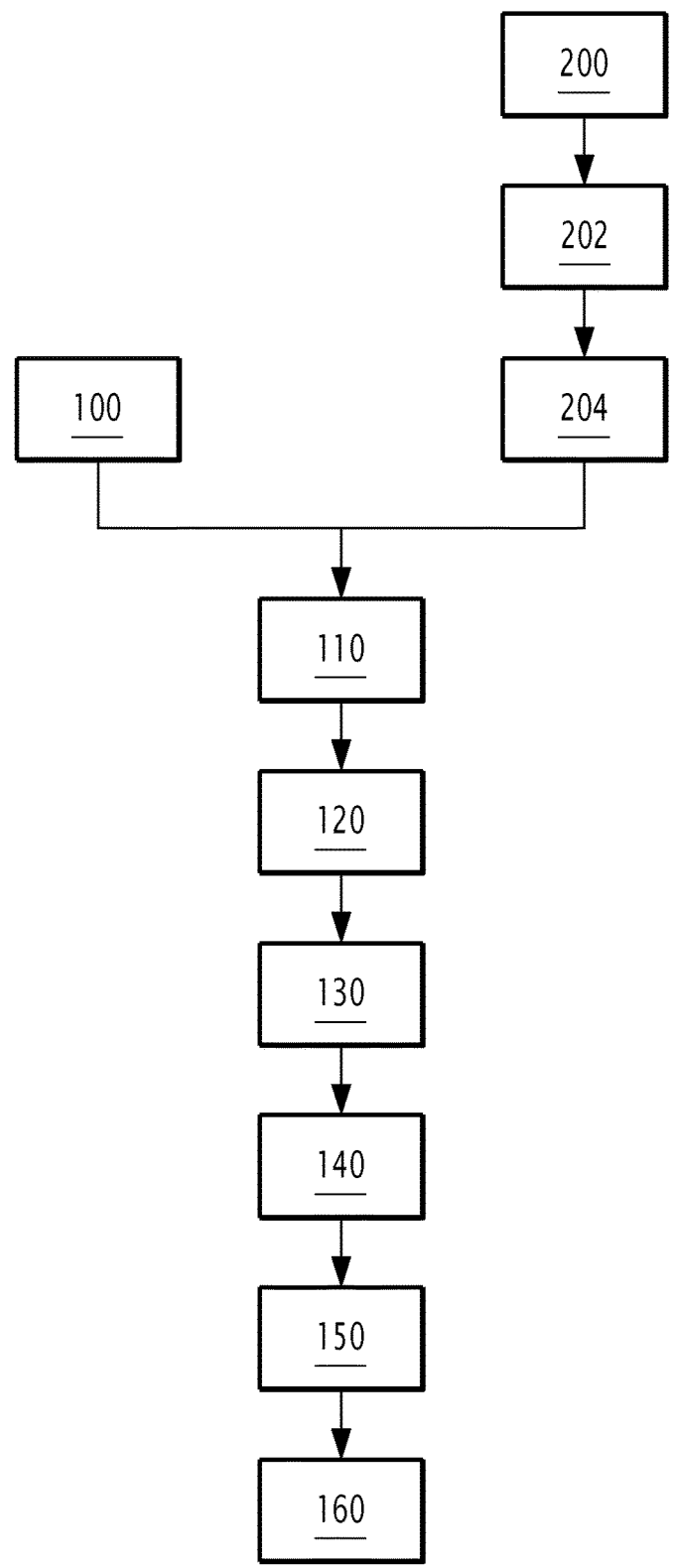
FIG. 3 is a flowchart of a test method, implemented by the test device of FIG. 1 or FIG. 2.

A test method for an avionic function to be tested implemented by the test device 20 will now be described, in light of FIG. 3.

According to the embodiment of FIG. 1, the method comprises a step 100 for reception, by the one-way receiver 40, of flight data Dv coming from the at least one avionic equipment item 15.

The test method next comprises a step 110 for acquiring flight data Dv coming from the at least one avionic equipment item 15, carried out by the acquisition module 24.

Next, during a computing step 120, the computing module 26 implements the avionic function to be tested from acquired flight data Dv, that is to say, executes the avionic function to be tested from acquired flight data Dv. The computing module 26 then computes simulated output data Ds resulting from the application of the avionic function to be tested to the acquired flight data Dv, the avionic function to be tested being able to deliver, from said flight data Dv, said simulated output data Ds.

As an optional addition, the method comprises, after the computing step 120, a step 130 for storing computed simulated output data Ds, implemented by the storage module 28.

As an optional addition, the method comprises, after the computing step 120, a step 140 for sending, via the sending module 30, simulated output data Ds to the outside equipment 32.

As an optional addition, the method comprises a step 150 for changing the avionic function to be tested. This change step 150 comprises the reception, by the receiving module 30 and by the outside equipment item 32, of a respective change signal M of the avionic function to be tested, and the change, by the change module 36, of the avionic function to be tested as a function of the received change signal M, more specifically by using the change data contained in the received change signal M.

As an optional addition, the method comprises a step 160 for selecting the avionic function to be tested among the avionic function(s) stored in the memory 22. The selection step 160 comprises the reception, by the receiving module 30 and from the outside equipment item 32, of a respective selection signal S of the avionic function to be tested, and the selection, by the selection module 38 and as a function of the received selection signal S, of the avionic function to be tested among the avionic functions stored in the memory 22, for example by identifying said avionic function to be selected via the avionic function identifier contained in the received selection signal S.

According to the embodiment of FIG. 2, the method comprises, before the acquisition step 110 and instead of the reception step 100, a step 200 for generating, via the request module 50, the request(s) R as a function of the list of flight data Dv associated with the avionic function to be tested and the available flight data table of each avionic equipment item 15, then a step 202 for sending by the or each transceiver 46 of at least one request R to the at least one avionic equipment item 15, and lastly a step 204 for reception, by the or each transceiver 46, of the flight data Dv coming from the at least one avionic equipment item 15 following the transmission of the request R.

According to this embodiment of FIG. 2, the method then comprises, after these generating 200, sending 202 and receiving 204 steps, the acquisition 110 and computing 120 steps, like before for the embodiment of FIG. 1, as well as, as an optional addition, the storage 130, sending 140, change 150 and/or selection 160 steps.

The test device 20 according to the invention then makes it possible to develop and test one or several avionic functions directly in the flight phase of the aircraft 10, without these functions having been validated beforehand by ground tests. This in particular makes it possible to limit the database necessary for the test. Indeed, the tests can be done on predetermined test situations, and only the simulated output data are recovered. Thus, only the data relevant for the development of the avionics functions are retained.

Furthermore, the test device 20 according to the invention allows the remote change or update of such avionic functions to be tested, following the analysis of the simulated output data Ds received remotely, for example by an engineering firm on the ground, which makes it possible to reconfigure the test device 20 during the flight phase of the aircraft 10, without specific intervention, such as maintenance, on the aircraft 10.

Furthermore, the test device 20 makes it possible to eliminate a step for making an operational prototype. It also offers the possibility of changing—in particular in flight— the avionic function to be tested, for example as a function of the output data computed, then transmitted by the sending module 30 to the outside equipment item 32.

The test device 20 according to the embodiment of FIG. 1 makes it possible, via its one-way link(s) with the at least one avionic equipment item 15, to recover flight data Dv from the at least one avionic equipment item 15, without interfering with its operation. This makes it possible to limit the risk that the operation of the at least one avionic equipment item 15 will be disrupted by the test device 20.

The test device 20 according to the embodiment of FIG. 2 makes it possible to recover only the necessary flight data Dv at the input of the avionic function to be tested. This also makes it possible to limit the risk that the operation of the at least one avionic equipment item 15 will be disrupted by the test device 20, in particular owing to the IDEM protocol used for the requests R, and the sending of flight data in response to the requests R.

The invention claimed is:

1. An electronic test device for at least one avionic function to be tested, embedded in an aircraft, the aircraft comprising at least one avionic equipment item,
   the test device embedded in the aircraft being connected to the at least one avionic equipment item and comprising:
   an acquisition module, configured to acquire flight data from the at least one avionic equipment item during the aircraft's flight,
   a computing module, configured to compute simulated output data, from the acquired flight data via an implementation of the avionic function to be tested, the avionic function to be tested being able, from said flight data, to deliver said output data, and
   a sending module configured to transmit the computed simulated output data to an equipment item outside the aircraft, wherein the implementation of the avionic function is performed during the aircraft's flight.

2. The device according to claim 1, wherein the test device comprises, for the connection with each avionic equipment item, only a one-way receiver configured to receive the flight data coming from said avionic equipment item.

3. The device according to claim 1, wherein, the test device comprises, for the connection with each avionic equipment item, a transceiver configured to send said avionic equipment item a request and to receive the flight data coming from said avionic equipment item in response to said request.

4. The device according to claim 1, wherein the equipment item outside the aircraft is an equipment item on the ground.

5. The device according to claim 1, wherein the test device further comprises:
   a first receiving module configured to receive a change signal of the avionic function to be tested, in particular coming from an equipment item outside the aircraft, such as an equipment item on the ground, and
   a change module configured to modify the avionic function to be tested as a function of the received change signal.

6. The device according to claim 5, wherein the change signal comes from an equipment item outside the aircraft.

7. The device according to claim 1, wherein the test device comprises:
   a memory configured to store a plurality of avionic functions,
   a second receiving module configured to receive a selection signal of the avionic function, in particular coming from an equipment item outside the aircraft, such as an equipment item on the ground, and
   a selection module configured to select, as a function of the received selection signal, the avionic function to be tested among said avionic functions stored in the memory.

8. The device according to claim 7, wherein the change signal comes from an equipment item outside the aircraft.

9. The device according to claim 1, wherein, the avionic function to be tested is chosen from the group consisting of: a function for avoiding collisions with the ground, a function for detecting oscillations caused by aeroelastic instabilities, a function for detecting oscillations caused by a pilot, a function for avoiding collisions with another aircraft, and a function for monitoring of the path.

10. The device according to claim 9, wherein, when the function to be tested is the function for avoiding collision with the ground, the simulated output data include: a remaining time before the detected collision; the flight data during the detection of the collision risk; a status of a terrain sensor; and a calculated avoidance path.

11. The device according to claim 9, wherein, when the function to be tested is the function for detecting oscillations induced by aeroelastic instabilities, the simulated output data include: a state of the detection of the aeroelastic instability, the flight data during the detection of the abnormal behavior, and a generated change of the electric flight controls.

12. The device according to claim 9, wherein, when the function to be tested is the function for detecting pilot-induced oscillations induced by aeroelastic instabilities, the simulated output data include: a state of the detection of the pilot-induced oscillations, the flight data during the detection of the abnormal behavior, and a generated change of the electric flight controls.

13. The device according to claim 9, wherein, when the function to be tested is the collision avoidance function with another aircraft, the simulated output data include: a time remaining before the detected collision, the flight data upon the detection of the collision risk, a computed avoidance path a the displayed message.

14. The device according to claim 9, wherein, when the function to be tested is the path monitoring function, the simulated output data include: a time remaining before the unanticipated behavior, the flight data upon the detection of the unanticipated behavior, and a parameter responsible for the unanticipated behavior.

15. The device according to claim 1, wherein the acquired flight data comprise:
   attitude information of the aircraft; engine operating data; electronic flight control data; and mechanical flight control data.

16. The device according to claim 1, wherein the avionic function has not been previously validated through tests on the ground.

17. The device according to claim 1, wherein the sending module is configured to transmit, to the equipment item outside the aircraft, only the simulated output data computed as a function of the acquired flight data.

18. The device according to claim 17, wherein the device allows to remotely change or update the avionic functions to be tested, following an analysis of the simulated output data received remotely.

19. An aircraft comprising at least one avionic equipment item and an electronic test device for at least one avionic function to be tested, wherein the test device is according to claim 1.

20. A test method for at least one avionic function to be tested, the method being carried out by an electronic test device embedded in an aircraft, the aircraft comprising at least one avionic equipment item, the test device embedded in the aircraft being connected to the at least one avionic equipment item, the method including:

a step for acquiring flight data coming from the at least one avionic equipment item during the aircraft's flight, a step for computing simulated output data, from the acquired flight data via an implementation of the avionic function to be tested, the avionic function to be tested delivering, from said flight data, said output data, and a step for transmitting the computed simulated output data to an equipment item outside the aircraft, wherein the implementation of the avionic function is performed during the aircraft's flight.

21. A computer program product comprising software instructions which, when executed by a computer, carry out a method according to claim 20.

* * * * *